(12) United States Patent
De Wind (10) Patent No.: US 10,069,952 B2
(45) Date of Patent: Sep. 4, 2018

(54) COVER GLASS FOR MOBILE DEVICE

(71) Applicant: MAGNA MIRRORS OF AMERICA, INC., Holland, MI (US)

(72) Inventor: Darryl P. De Wind, West Olive, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 475 days.

(21) Appl. No.: 14/616,773

(22) Filed: Feb. 9, 2015

(65) Prior Publication Data

US 2015/0229745 A1    Aug. 13, 2015

Related U.S. Application Data

(60) Provisional application No. 61/939,495, filed on Feb. 13, 2014.

(51) Int. Cl.
*H04M 1/02* (2006.01)

(52) U.S. Cl.
CPC ......... *H04M 1/026* (2013.01); *H04M 1/0266* (2013.01)

(58) Field of Classification Search
CPC ........................... H04M 1/026; H04M 1/0266
See application file for complete search history.

(56) References Cited

U.S. PATENT DOCUMENTS

| | | | |
|---|---|---|---|
| 4,793,690 A | 12/1988 | Gahan et al. | |
| 5,066,112 A | 11/1991 | Lynam et al. | |
| 5,193,029 A | 3/1993 | Schofield et al. | |
| 5,285,060 A | 2/1994 | Larson et al. | |
| 5,416,313 A | 5/1995 | Larson et al. | |
| 5,530,240 A | 6/1996 | Larson et al. | |
| 5,594,222 A | 1/1997 | Caldwell | |
| 5,668,663 A | 9/1997 | Varaprasad et al. | |
| 5,724,187 A | 3/1998 | Varaprasad et al. | |
| 6,001,486 A | 12/1999 | Varaprasad et al. | |
| 6,310,611 B1 | 10/2001 | Caldwell | |
| 6,320,282 B1 | 11/2001 | Caldwell | |
| 6,329,925 B1 | 12/2001 | Skiver et al. | |

(Continued)

OTHER PUBLICATIONS

Antutu Benchmark, "Moto X will allegedly feature wrap-around Magic Glass", http://www.antutu.com/en/doc/105768.htm, Jul. 30, 2013.*

*Primary Examiner* — Kashif Siddiqui
(74) *Attorney, Agent, or Firm* — Honigman Miller Schwartz and Cohn, LLP (57) ABSTRACT

A portable electronic device includes a housing and a glass cover panel having a generally planar central region and a rounded or curved perimeter region circumscribing the generally planar central region. The portable electronic device includes circuitry disposed in the housing and operable to detect a touch or proximity of a user at the glass cover panel at the generally planar central region. The rounded perimeter region has an exposed rounded surface circumscribing the generally planar central region and the housing does not overlap the rounded perimeter region of the glass cover panel. The rounded perimeter region may have a radius of curvature of greater than about 0.5 mm. The rounded perimeter region provides a smooth curved transition between a generally planar front surface of the generally planar central region of the glass cover panel and a side surface of the housing of the portable electronic device.

13 Claims, 7 Drawing Sheets

(56) References Cited

U.S. PATENT DOCUMENTS

| | | |
|---|---|---|
| 6,369,804 B1 | 4/2002 | Sandbach |
| 6,420,975 B1 | 7/2002 | DeLine et al. |
| 6,428,172 B1 | 8/2002 | Hutzel et al. |
| 6,437,258 B1 | 8/2002 | Sandbach |
| 6,452,479 B1 | 9/2002 | Sandbach |
| 6,492,980 B2 | 12/2002 | Sandbach |
| 6,501,465 B2 | 12/2002 | Sandbach |
| 6,504,531 B1 | 1/2003 | Sandbach |
| 6,627,918 B2 | 9/2003 | Getz et al. |
| 6,690,268 B2 | 2/2004 | Schofield et al. |
| 6,902,284 B2 | 6/2005 | Hutzel et al. |
| 7,046,448 B2 | 5/2006 | Burgner |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,541 B2 | 8/2007 | Kuramoto et al. |
| 7,274,501 B2 | 9/2007 | McCabe et al. |
| 7,338,177 B2 | 3/2008 | Lynam |
| 7,360,932 B2 | 4/2008 | Uken et al. |
| 7,370,983 B2 | 5/2008 | De Wind et al. |
| 7,446,924 B2 | 11/2008 | Schofield et al. |
| 7,626,749 B2 | 12/2009 | Baur et al. |
| 7,734,392 B2 | 6/2010 | Schofield et al. |
| 7,855,755 B2 | 12/2010 | Weller et al. |
| 8,154,418 B2 | 4/2012 | Peterson et al. |
| 8,890,955 B2 | 11/2014 | Peterson |
| 8,976,141 B2 * | 3/2015 | Myers ................ H04M 1/0268 345/173 |
| 2006/0050018 A1 | 3/2006 | Hutzel et al. |
| 2006/0061008 A1 | 3/2006 | Karner et al. |
| 2009/0015736 A1 | 1/2009 | Weller et al. |
| 2010/0097469 A1 | 4/2010 | Blank et al. |
| 2012/0038964 A1 | 2/2012 | De Wind et al. |
| 2012/0154591 A1 | 6/2012 | Baur et al. |
| 2012/0236388 A1 | 9/2012 | De Wind et al. |
| 2013/0300697 A1 * | 11/2013 | Kim ..................... G06F 1/1626 345/173 |
| 2014/0022390 A1 | 1/2014 | Blank et al. |
| 2014/0293169 A1 | 10/2014 | Uken et al. |
| 2015/0097955 A1 | 4/2015 | De Wind et al. |

\* cited by examiner

PRIOR ART

COVER GLASS FOR MOBILE DEVICE

CROSS REFERENCE TO RELATED APPLICATION

The present application claims the filing benefits of U.S. provisional application Ser. No. 61/939,495, filed Feb. 13, 2014, which is hereby incorporated herein by reference in its entirety.

FIELD OF THE INVENTION

The present invention relates generally to the field of mobile devices, such as smart phones, cell phones and personal data devices and, more particularly, to the cover glass for mobile devices.

BACKGROUND OF THE INVENTION

Figure 1:
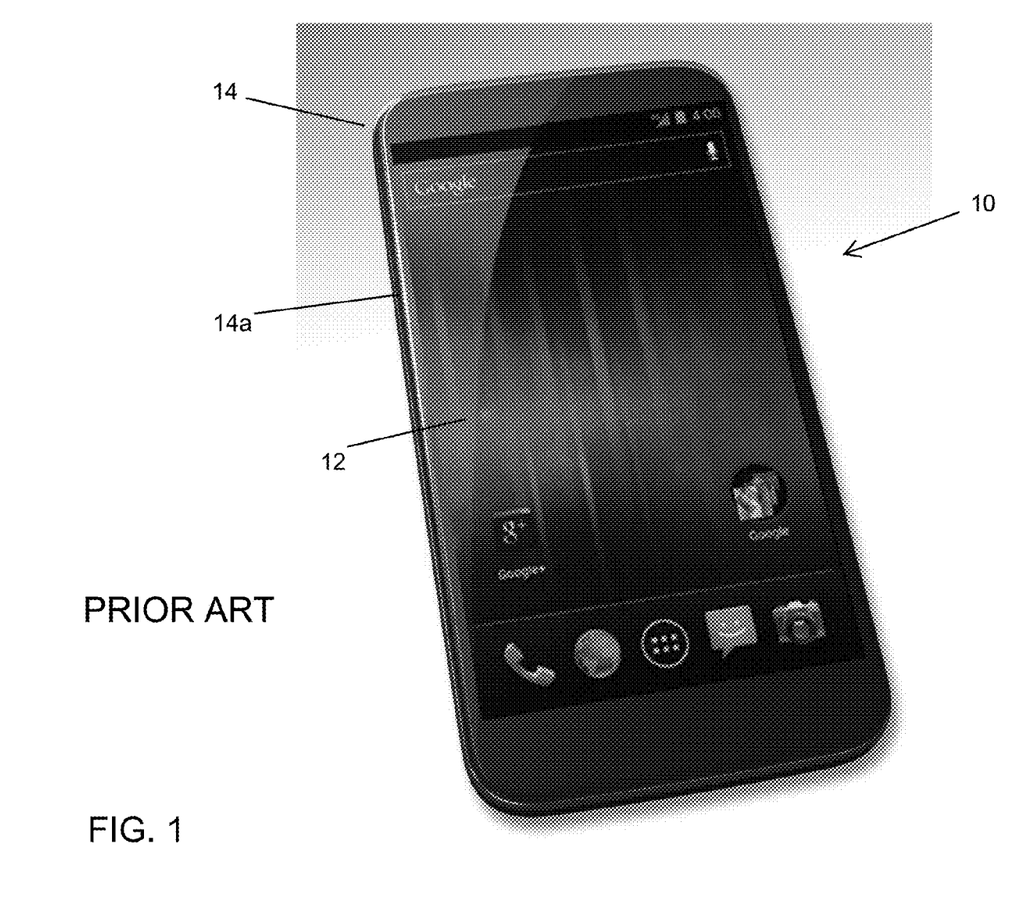
FIG. 1 is a perspective view of a known smart phone.
Figure 2:
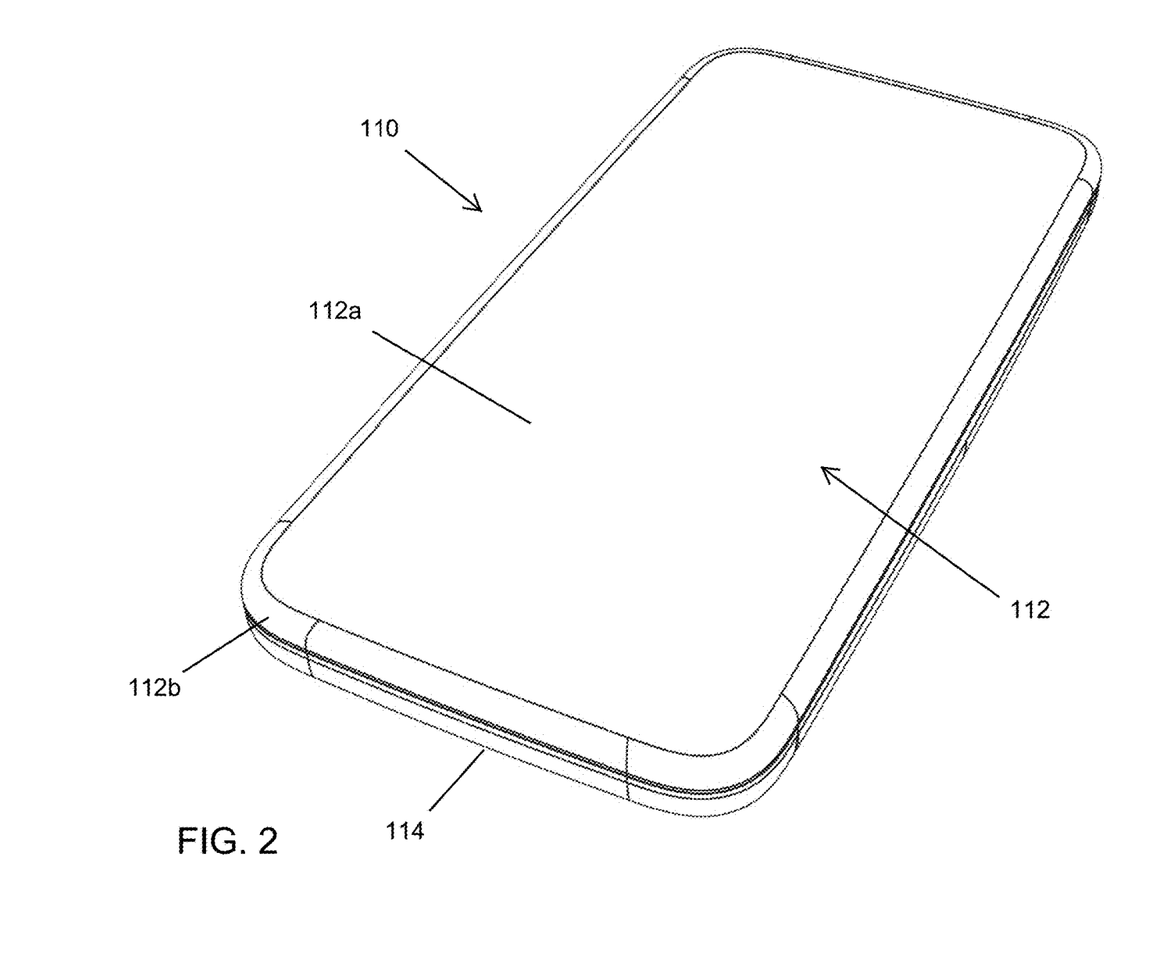
FIGS. 2 and 3 are perspective views of personal mobile devices having a bezeless glass cover panel in accordance with the present invention.
Figure 3:
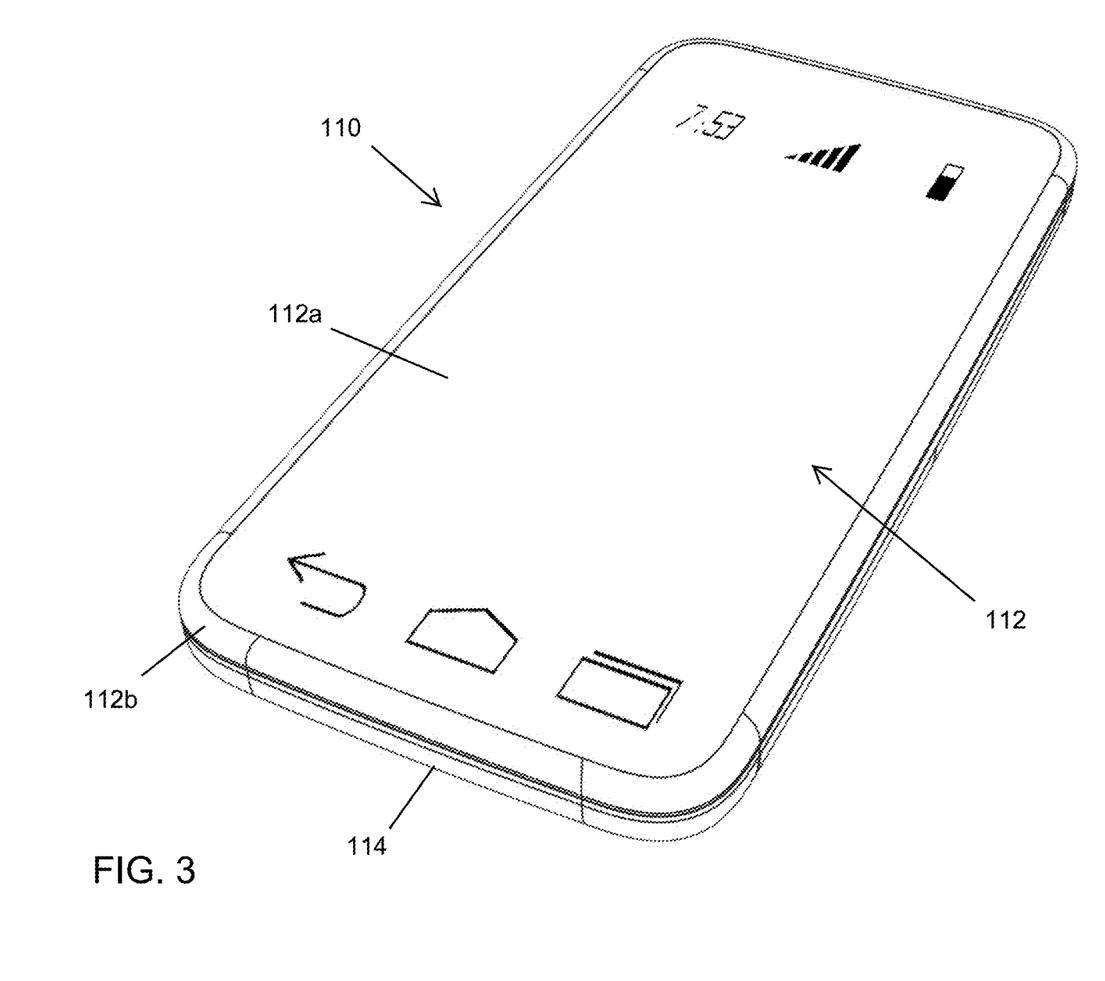
Figure 4:
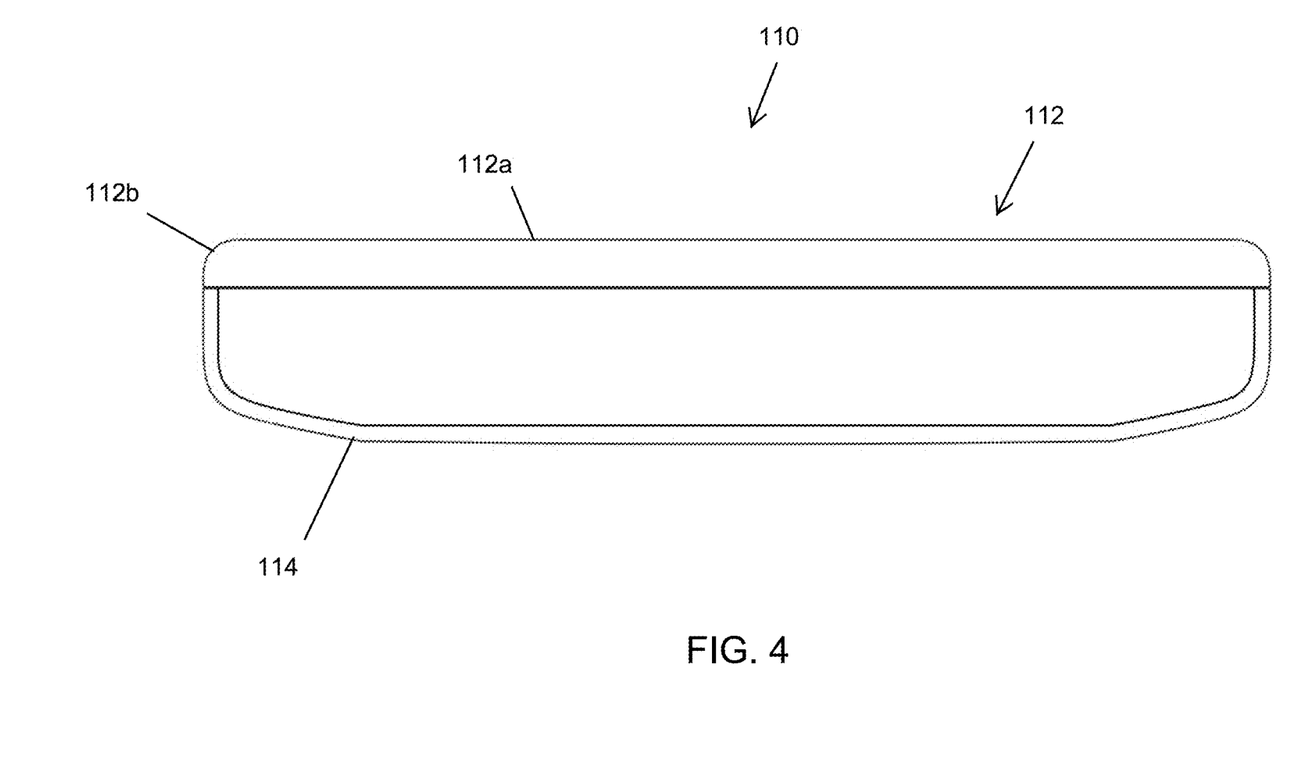
FIG. 4 is an end elevation and sectional view of a personal mobile device having the cover glass of the present invention.

Personal mobile devices, such as smart phones, typically include a touch screen that has a thin glass substrate and touch sensors disposed behind the thin glass substrate to detect the touch of a user at the glass substrate. The housing of the device has a perimeter region or bezel that overlaps and circumscribes the perimeter edge of the glass substrate. For example, FIG. 1 shows a known smart phone 10 with the glass substrate 12 received in the housing 14, whereby the housing or bezel 14a of the housing circumscribes and overlaps the perimeter edge of the glass substrate. The bezel portion is rounded to provide the desired radius of curvature around the glass substrate.

SUMMARY OF THE INVENTION

The present invention provides a cover glass for a personal mobile device that has a rounded perimeter edge that is exposed at the periphery of the personal mobile device. The personal mobile device thus does not include a bezel portion that circumscribes or overlaps the periphery of the cover glass. The cover glass of the present invention may be formed to have a desired thickness at a touch or active region of the device and to have the desired radius of curvature at the periphery of the cover glass and device.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, a personal mobile device 110 (such as a smart phone, cell phone, tablet, personal data device and/or the like) includes a cover glass substrate 112 that attaches at a housing 114 (such as a plastic molded housing) of the device 110 to provide a display screen and touch screen at the device 110 (FIGS. 2, 3, 4 and 6). The cover glass substrate 112 comprises a thin glass substrate or panel that is sufficiently thin at least at an active area or region or touch sensitive area or region 112a to allow for a touch sensor or capacitive sensor or projective capacitive sensor of the device to sense a user's touch or swipe at the outer surface of the glass cover. The glass substrate 112 has rounded or curved perimeter edges 112b around the circumference of the active or touch sensitive region and the housing does not overlap the perimeter edges of the glass substrate, such that the rounded or curved perimeter edges of the glass substrate are exposed at the device.

Figure 5:
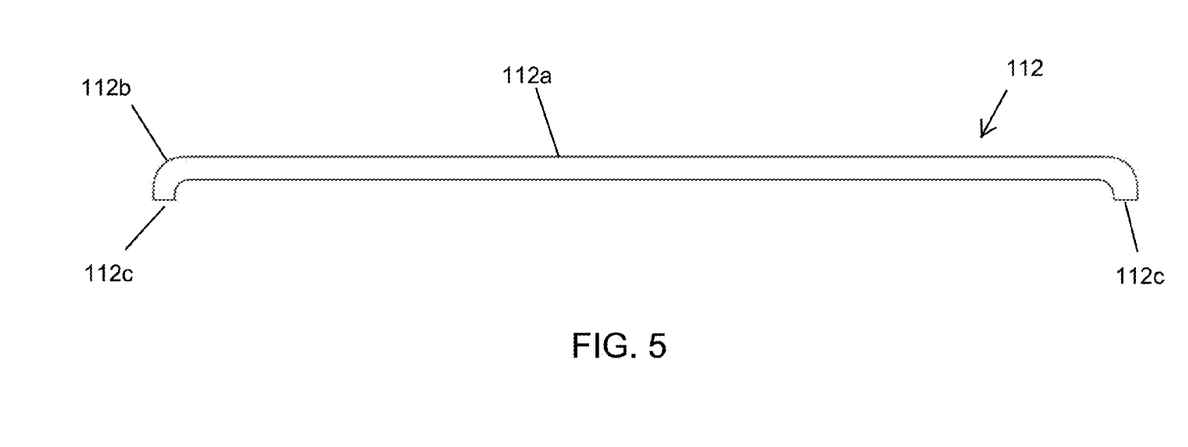
FIG. 5 is a sectional view of the cover glass of the personal mobile device of FIG. 4.
Figure 6:
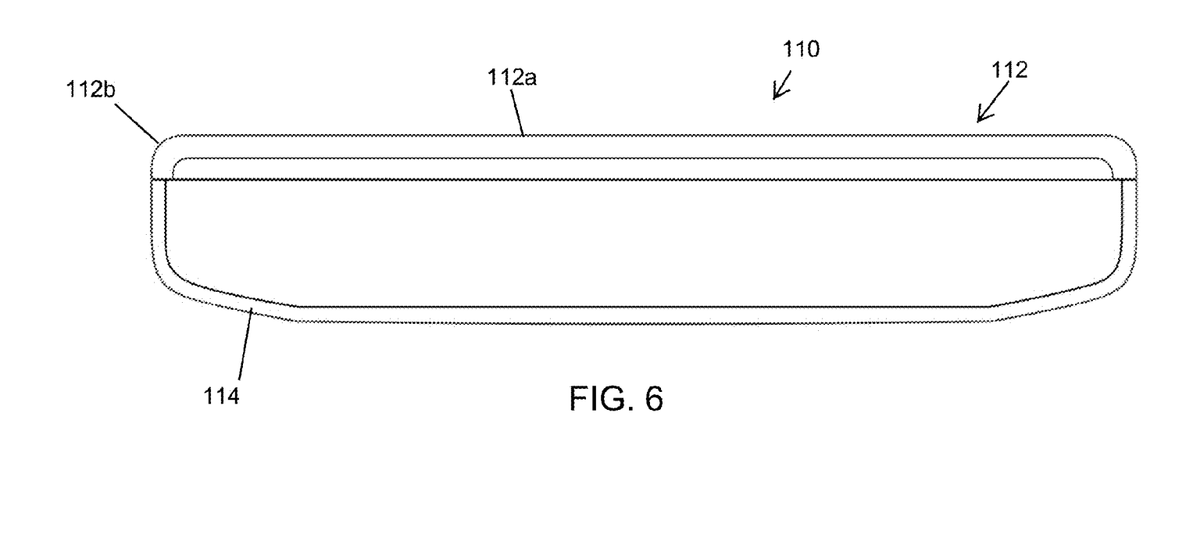
FIG. 6 is a sectional view of the personal mobile device of FIG. 4.
Figure 7:
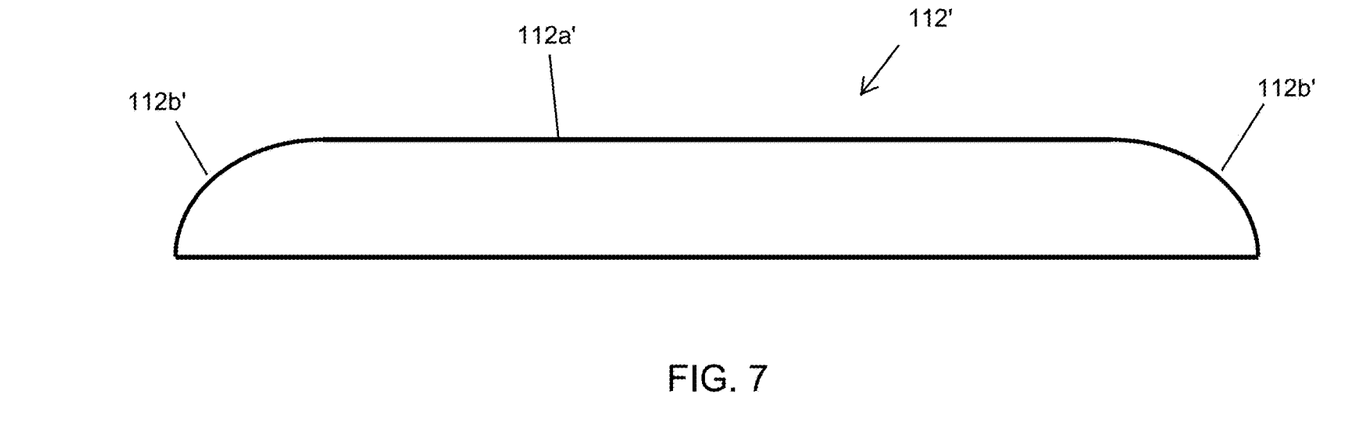
FIG. 7 is a side elevation of a cover glass for a personal mobile device, with a desired radius of curvature established around the exposed periphery of the cover glass in accordance with the present invention.
Figure 8:
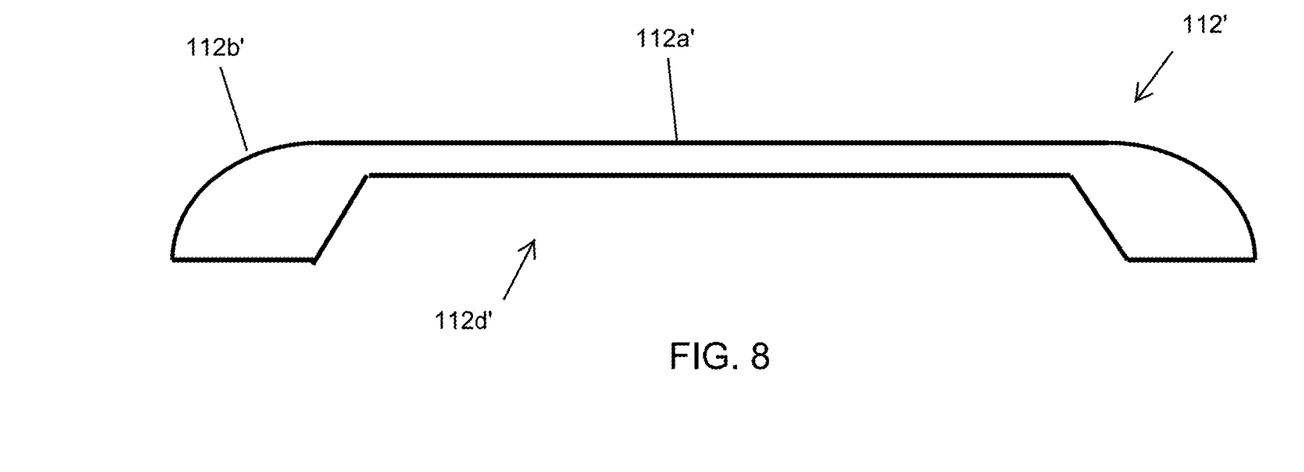
FIG. 8 is a sectional view of a cover glass similar to FIG. 7, that is formed to be thinner at a touch or active region of the device in accordance with the present invention.

In order to function as a touch sensitive surface of the device, the glass substrate comprises a thin substrate that is attached at the housing. As can be seen with reference to FIGS. 5 and 6, the substrate may be formed or bent to have rounded edges 112b, with the center region 112a comprising a thin generally planar substrate at the active display and/or touch area of the device. The curved perimeter edges 112b have end or mating surfaces 112c that mate with or interface with the perimeter edges of the opening of the housing or casing 114 (FIG. 6), such that the exposed side surface of the periphery of the glass substrate 112 is generally coplanar with the side surface of the housing 114, whereby the side surface of the periphery of the glass substrate and the curved perimeter surface provide a smooth curved or rounded transition between the generally planar front or outer surface of the glass substrate and the side walls or surfaces of the housing, and with no part of the molded plastic housing 114 extending generally beyond any part of the glass substrate 112.

The glass cover or substrate or panel 112 may be formed via any suitable forming means, such as via grinding or ablating and polishing the substrate to the desired dimensions or via bending or forming a thin substrate to the desired shape. The radius of curvature of the perimeter surface or edges of the glass panel may be selected depending on the desired appearance or application of the glass cover panel.

The glass substrate may comprise any suitable height and/or width for any personal electronic device application (such as, for example, a width of about 2.75 inches and a height of about 5.5 inches or thereabouts for a smart phone application. The thickness of the glass substrate at the center or active or touch region may be less than around 3 mm or less than about 3.2 mm, and preferably less than about 1.5 mm, such as around 0.6 mm or thereabouts, and preferably at least 0.5 mm or thereabouts. The rounded or curved perimeter edge or surface may have a radius of curvature from around 0.5 mm to about 3 mm or thereabouts. Optionally, the rounded or curved perimeter edge or surface may have a variable radius of curvature between the generally planar front surface and the side surface of the glass and of the housing or casing.

Figure 9:
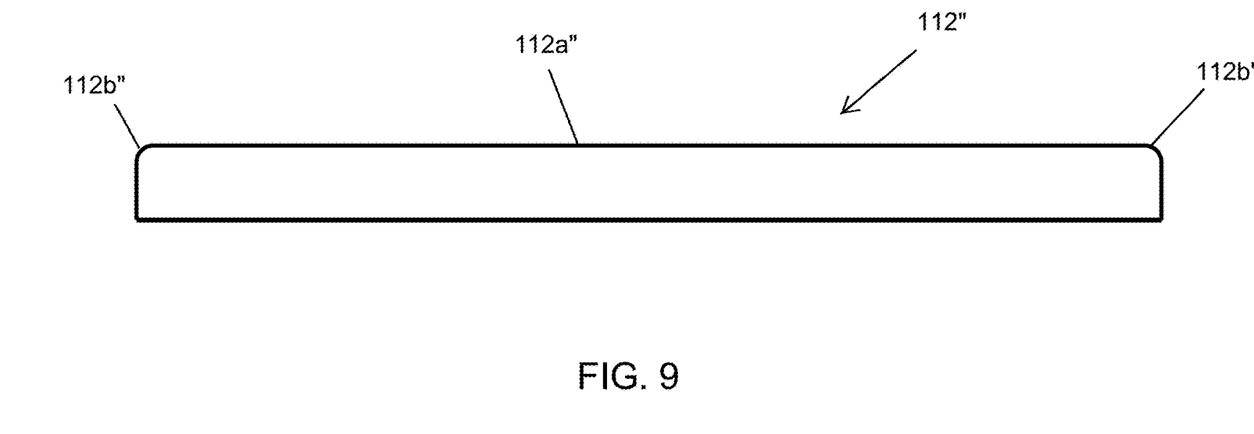
FIG. 9 is a side elevation of a cover glass for a personal mobile device, with a desired radius of curvature established around the exposed periphery of the cover glass in accordance with the present invention.
Figure 10:
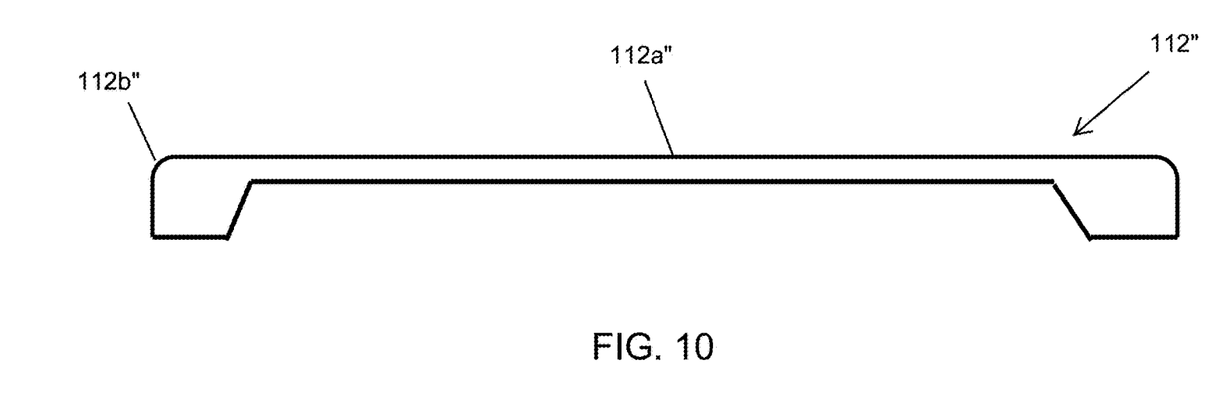
FIG. 10 is a sectional view of a cover glass similar to FIG. 9 that is formed to be thinner at a touch or active region of the device in accordance with the present invention.

For thicker glass substrate applications, such as shown in FIGS. 7-10, the rear or second surface of the thicker glass substrate may be cored or countersunk or ground so that the useable touch area of the glass panel is thin enough to be used with touch sensitive technology. For example, and with reference to FIGS. 7 and 8, the substrate 112' may be formed with a narrower or thinner center region 112a' (FIG. 7), while having thicker or curved perimeter regions 112b'. The glass substrate may be formed via grinding or ablating or removing or recessing the rear central region 112d' to the desired thickness and/or may be bent or otherwise formed to the desired dimensions. Optionally, and such as shown in FIGS. 9 and 10, the glass substrate 112" may be formed with a narrower or thinner center region 112a" (FIG. 10), while having thicker or curved perimeter regions 112b", such as with a smaller radius of curvature around the exposed periphery of the substrate (as compared to the cover glass 112'), depending on the particular application of the glass cover panel or substrate.

The personal device and glass cover panel thus provide a frameless or bezelless device, and the perimeter region of the glass cover panel of the device thus is rounded or radiused or curved and exposed, such as by utilizing aspects of the glass substrates described in International Publication Nos. WO 2013/126719; WO 2013/071070; WO 2012/051500; WO 2010/124064 and/or WO 2011/044312, and/or U.S. Pat. Nos. 7,253,723 and/or 8,154,418, which are hereby incorporated herein by reference in their entireties. In such an application, the glass substrate may have a rounded or ground perimeter edge region at its periphery of the front or exposed surface, and such a rounded or ground or polished perimeter edge region of the glass substrate may be exposed to or viewable by the user of the device and may comprise a polished perimeter that is polished to a water-clear finish and may have a radius of curvature of at least about 0.5 mm or thereabouts, such as a radius of curvature of at least about 1 mm or thereabouts or at least about 1.5 mm or thereabouts and preferably no more than about 2.5 mm or thereabouts. The rounded perimeter edge of the glass substrate may provide a generally smooth or continuous transition from the generally planar front surface of the glass substrate to the outer surface of the housing or casing at which the glass substrate is attached. The glass substrate may comprise a transparent glass panel or may be frosted or otherwise coated or decorated, depending on the particular application of the glass substrate and the desired features and appearance of the device at which it is attached. The coatings may provide the desired decorative appearance and may be selectively removed or otherwise adjusted to provide icons or the like that may be backlit by one or more light sources or light emitting diodes of the device.

Optionally, and desirably, the glass substrate is toughened, and preferably tempered, and more preferably chemically tempered (such as is known in the glass tempering arts) so as to resist breakage. Such chemical tempering is performed on the glass substrate after the rounding of the glass substrate. The glass substrate preferably is soda-lime glass or borosilicate glass or the like.

The mobile device includes touch sensitive elements or touch sensors or proximity sensors disposed behind the glass cover panel. Such touch sensitive elements may comprise any suitable touch or proximity sensors and may utilize aspects of the touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and 6,369,804, which are hereby incorporated herein by reference in their entireties.

The portable device includes a display screen that is viewable through the glass cover panel or substrate. The display device or screen may utilize aspects of the display screens described in U.S. Pat. Nos. 8,890,955; 5,530,240; 6,329,925; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent application Ser. No. 09/585,379, filed Jun. 1, 2000, now abandoned; and/or Ser. No. 10/207,291, filed Jul. 29, 2002, now abandoned, and/or U.S. Pat. Pub. Nos. US-2006-0061008; US-2006-0050018; US-2009-0015736; US-2009-0015736 and/or US-2010-0097469, and/or International Publication No. WO 2011/028686, which are all hereby incorporated herein by reference in their entireties.

Optionally, the glass cover sheet or panel or substrate may include an opaque or substantially opaque or hiding perimeter layer or coating or band disposed around a perimeter region of the display or active area of the panel and device and/or around the perimeter region of the cover panel itself. Such a hiding layer or band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. No. 7,184,190 and/or 7,255,451, which are hereby incorporated herein by reference in their entireties). Optionally, other opaque or substantially opaque coatings or bands may be implemented while remaining within the spirit and scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A portable electronic device, said portable electronic device comprising:

a housing;

a glass cover panel disposed at said housing, said glass cover panel comprising a generally planar central region and a rounded perimeter region circumscribing said generally planar central region;
wherein said glass cover panel comprises a generally planar front surface that is circumscribed by an exposed rounded surface;
wherein said generally planar front surface of said glass cover panel extends partially across said rounded perimeter region;
circuitry disposed in said housing and operable to detect a touch or proximity of a user at said generally planar front surface of said glass cover panel at said generally planar central region;
wherein said rounded perimeter region comprises said exposed rounded surface circumscribing said generally planar central region and wherein said housing does not overlap said exposed rounded surface and said generally planar front surface of said rounded perimeter region of said glass cover panel;
wherein said generally planar central region has a thickness spanning between said generally planar front surface and a rear surface of said generally planar central region;
wherein said rounded perimeter region of said glass cover panel has a thickness spanning between said generally planar front surface and a rear surface of said rounded perimeter region;
wherein said rear surface of said generally planar central region is recessed relative to said rear surface of said rounded perimeter region such that the thickness of said rounded perimeter region of said glass cover panel is greater than the thickness of said generally planar central region of said glass cover panel;
wherein the thickness of said generally planar central region is less than 1.5 mm;
wherein said exposed rounded surface of said rounded perimeter region has a radius of curvature of greater than 0.5 mm and less than 3 mm; and
wherein said rounded perimeter region comprises a polished rounded perimeter region that is polished to a water-clear finish.

2. The portable electronic device of claim 1, wherein said portable electronic device comprises one of (i) a smart phone, (ii) a cell phone, (iii) a tablet and (iv) a personal data device.

3. The portable electronic device of claim 1, wherein said exposed rounded surface of said rounded perimeter region provides a smooth curved transition between said generally planar front surface of said glass cover panel and a side surface of said housing of said portable electronic device.

4. The portable electronic device of claim 1, wherein said exposed rounded surface of said rounded perimeter region has a radius of curvature of less than 2.5 mm.

5. The portable electronic device of claim 1, wherein said generally planar central region has a thickness of less than 1 mm.

6. The portable electronic device of claim 1, wherein said exposed rounded surface of said rounded perimeter region has a varying radius of curvature.

7. The portable electronic device of claim 1, wherein said housing comprises a molded plastic housing.

8. The portable electronic device of claim 1, wherein no part of said housing extends beyond any part of said glass cover panel.

9. A portable electronic device, said portable electronic device comprising:

a housing;
a glass cover panel disposed at said housing, said glass cover panel comprising a generally planar central region and a rounded perimeter region circumscribing said generally planar central region;
wherein said glass cover panel comprises a generally planar front surface that is circumscribed by an exposed rounded surface;
wherein said generally planar front surface of said glass cover panel extends partially across said rounded perimeter region;
circuitry disposed in said housing and operable to detect a touch or proximity of a user at said generally planar front surface of said glass cover panel at said generally planar central region;
wherein said rounded perimeter region comprises said exposed rounded surface circumscribing said generally planar central region and wherein said housing does not overlap said exposed rounded surface and said generally planar front surface of said rounded perimeter region of said glass cover panel;
wherein said exposed rounded surface of said rounded perimeter region provides a smooth curved transition between said generally planar front surface of said glass cover panel and a side surface of said housing of said portable electronic device;
wherein no part of said housing extends beyond any part of said glass cover panel;
wherein said portable electronic device comprises one of (i) a smart phone, (ii) a cell phone, (iii) a tablet and (iv) a personal data device;
wherein said generally planar central region has a thickness spanning between said generally planar front surface and a rear surface of said generally planar central region;
wherein said rounded perimeter region of said glass cover panel has a thickness spanning between said generally planar front surface and a rear surface of said rounded perimeter region;
wherein said rear surface of said generally planar central region is recessed relative to said rear surface of said rounded perimeter region such that the thickness of said rounded perimeter region of said glass cover panel is greater than the thickness of said generally planar central region of said glass cover panel;
wherein the thickness of said generally planar central region has a thickness of is less than 1.5 mm;
wherein said exposed rounded surface of said rounded perimeter region has a radius of curvature of greater than 0.5 mm and less than 3 mm; and
wherein said rounded perimeter region comprises a polished rounded perimeter region that is polished to a water-clear finish.

10. The portable electronic device of claim 9, wherein the thickness of said generally planar central region is less than 1 mm and wherein said exposed rounded surface of said rounded perimeter region has a radius of curvature of less than about 2.5 mm.

11. The portable electronic device of claim 9, wherein the thickness of said generally planar central region is less than 1 mm.

12. A portable electronic device, said portable electronic device comprising:

a housing, wherein said housing comprises a molded plastic housing;
a glass cover panel disposed at said housing, said glass cover panel comprising a generally planar central region and a rounded perimeter region circumscribing said generally planar central region;

wherein said glass cover panel comprises a generally planar front surface that is circumscribed by an exposed rounded surface;

wherein said generally planar front surface of said glass cover panel extends partially across said rounded perimeter region;

circuitry disposed in said housing and operable to detect a touch or proximity of a user at said generally planar front surface of said glass cover panel at said generally planar central region; and wherein said rounded perimeter region comprises said exposed rounded surface circumscribing said generally planar central region and wherein said housing does not overlap said exposed rounded surface and said generally planar front surface of said rounded perimeter region of said glass cover panel;

wherein said generally planar central region has a thickness spanning between said generally planar front surface and a rear surface of said generally planar central region;

wherein said rounded perimeter region of said glass cover panel has a thickness spanning between said generally planar front surface and a rear surface of said rounded perimeter region;

wherein said rear surface of said generally planar central region is recessed relative to said rear surface of said rounded perimeter region such that the thickness of said rounded perimeter region of said glass cover panel is greater than the thickness of said generally planar central region of said glass cover panel;

wherein said generally planar central region has a thickness of less than 1.5 mm and wherein said exposed rounded surface of said rounded perimeter region has a radius of curvature of greater than about 0.5 mm;

wherein said exposed rounded surface of said rounded perimeter region provides a smooth curved transition between said generally planar front surface of said glass cover panel and a side surface of said housing of said portable electronic device;

wherein said portable electronic device comprises one of (i) a smart phone, (ii) a cell phone, (iii) a tablet and (iv) a personal data device; and wherein said rounded perimeter region comprises a polished rounded perimeter region that is polished to a water-clear finish.

13. The portable electronic device of claim 12, wherein no part of said housing extends beyond any part of said glass cover panel.

* * * * *

UNITED STATES PATENT AND TRADEMARK OFFICE
CERTIFICATE OF CORRECTION

PATENT NO. : 10,069,952 B2  
APPLICATION NO. : 14/616773  
DATED : September 4, 2018  
INVENTOR(S) : Darryl P. De Wind

Page 1 of 1

It is certified that error appears in the above-identified patent and that said Letters Patent is hereby corrected as shown below:

In the Claims

<u>Column 6</u>
Claim 9, Line 47 "region has a thickness of is less than 1.5 mm;" should be --region is less than 1.5 mm;--

Signed and Sealed this
Twenty-seventh Day of November, 2018

Andrei Iancu
*Director of the United States Patent and Trademark Office*